(12) United States Patent
Karim

(10) Patent No.: US 11,068,865 B2
(45) Date of Patent: Jul. 20, 2021

(54) SYSTEM AND METHOD FOR PROVIDING MERCHANT LOYALTY REWARDS

(71) Applicant: Quercus (BVI) Limited

(72) Inventor: Aly Karim, Middlesex (GB)

(73) Assignee: QUERCUS (BVI) LIMITED, Tortola (VG)

( * ) Notice: Subject to any disclaimer, the term of this patent is extended or adjusted under 35 U.S.C. 154(b) by 368 days.

(21) Appl. No.: 14/721,414

(22) Filed: May 26, 2015

(65) Prior Publication Data

US 2015/0254615 A1 Sep. 10, 2015

Related U.S. Application Data

(63) Continuation of application No. 14/243,071, filed on Apr. 2, 2014, now abandoned, which is a continuation of application No. 12/709,810, filed on Feb. 22, 2010, now Pat. No. 8,732,082, which is a continuation-in-part of application No. 12/499,421, filed on Jul. 8, 2009, now Pat. No. 8,732,080.

(60) Provisional application No. 61/157,097, filed on Mar. 3, 2009.

(51) Int. Cl.
*G06Q 20/04* (2012.01)
*G06Q 30/02* (2012.01)
*G06Q 20/10* (2012.01)
*G06Q 20/40* (2012.01)
*G06Q 40/02* (2012.01)

(52) U.S. Cl.
CPC ......... *G06Q 20/10* (2013.01); *G06Q 20/1085* (2013.01); *G06Q 20/40* (2013.01); *G06Q 30/0226* (2013.01); *G06Q 40/02* (2013.01)

(58) Field of Classification Search
CPC .............................. G06Q 20/10; G06Q 20/40
USPC ...................................................... 705/44, 42
See application file for complete search history.

(56) References Cited

U.S. PATENT DOCUMENTS

| | | | | |
|---|---|---|---|---|
| 2008/0082418 A1* | 4/2008 | Fordyce | ................. | G06Q 30/02 705/14.34 |
| 2010/0145810 A1* | 6/2010 | Pourfallah | ............. | G06Q 20/12 705/17 |
| 2010/0211445 A1* | 8/2010 | Bodington | ............. | G06Q 30/02 705/14.17 |

(Continued)

*Primary Examiner* — Hai Tran
(74) *Attorney, Agent, or Firm* — Duane Morris LLP

(57) ABSTRACT

A computer-implemented system and method for processing an electronic payment that is initiated in response to a primary financial transaction between a first entity and a second entity. A computer is configured to receive electronic digital information relating to a primary financial transaction between the first entity and the second entity. A non-transitory computer readable electronic storage medium in operable communication with said computer is configured to store at least one customizable business rule associated with the electronic digital information, wherein the at least one customizable business rule includes a merchant loyalty reward. A transaction processor is in operable communication with at least one of the computer and electronic storage medium that is configured to determine all products purchased by the first entity from the electronic digital information; and determine, based on the electronic digital information, whether the merchant loyalty reward business rule applies.

8 Claims, 7 Drawing Sheets

(56) References Cited

U.S. PATENT DOCUMENTS

2010/0223187 A1* 9/2010 Fujita .................... G06Q 20/04
705/75

* cited by examiner

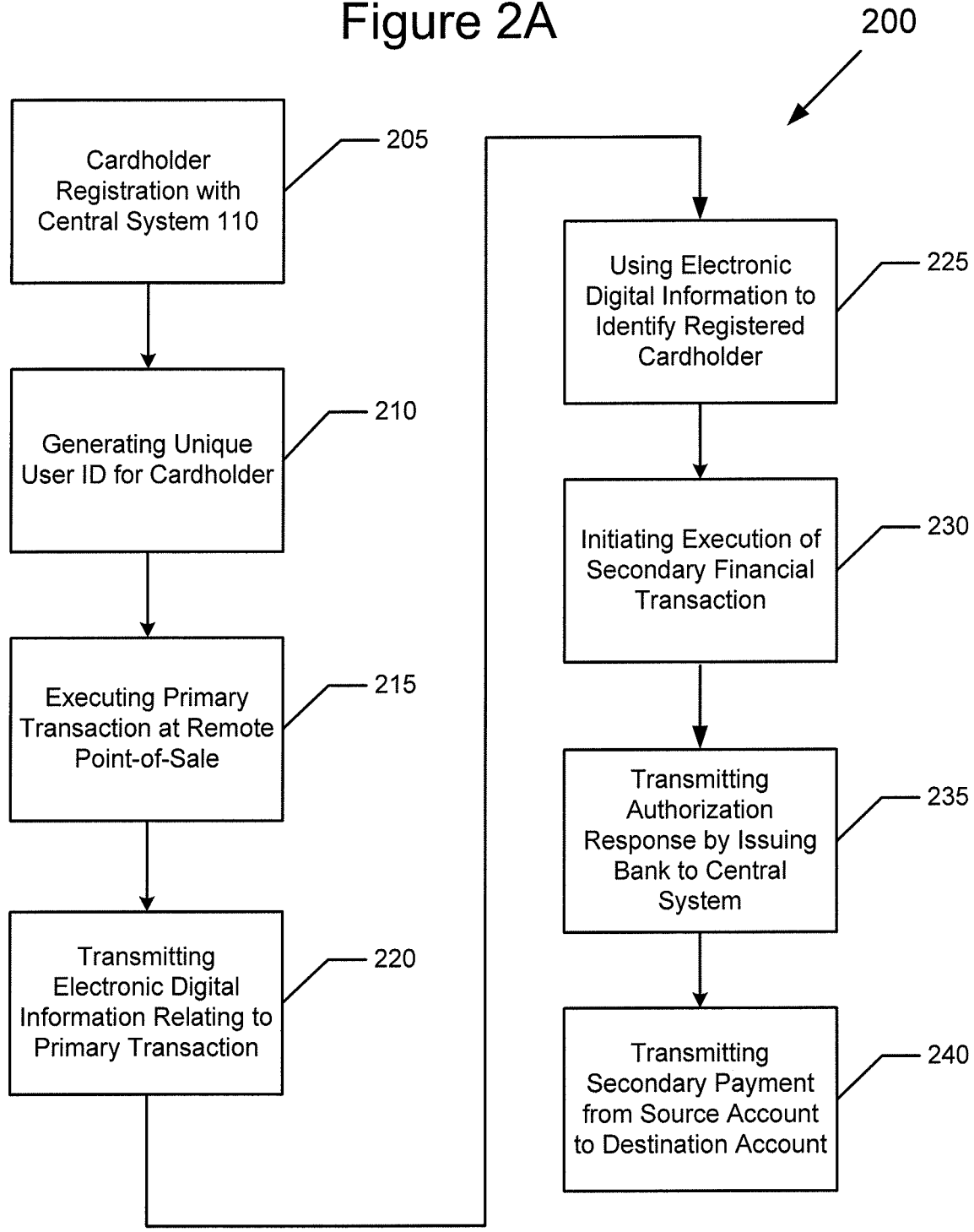

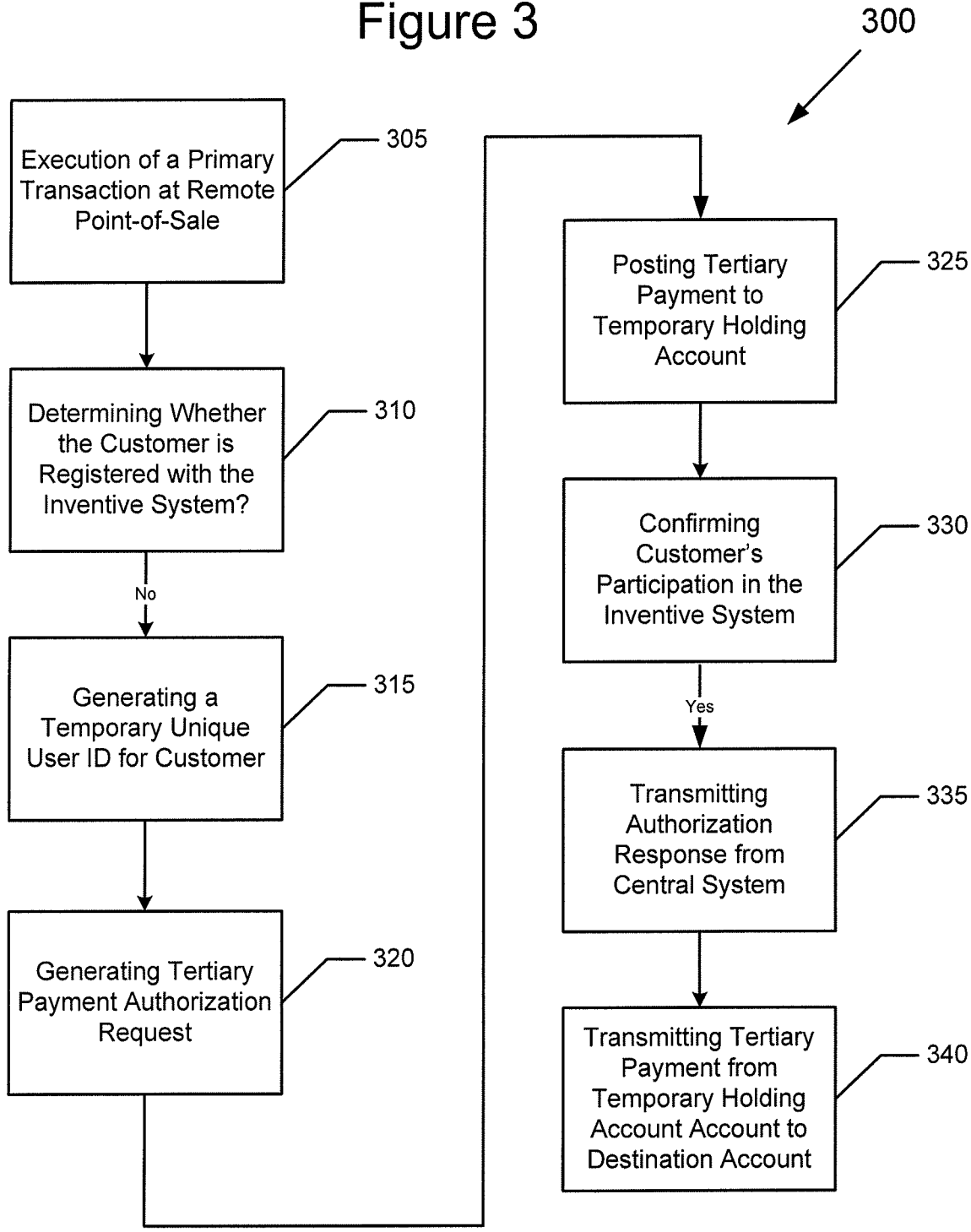

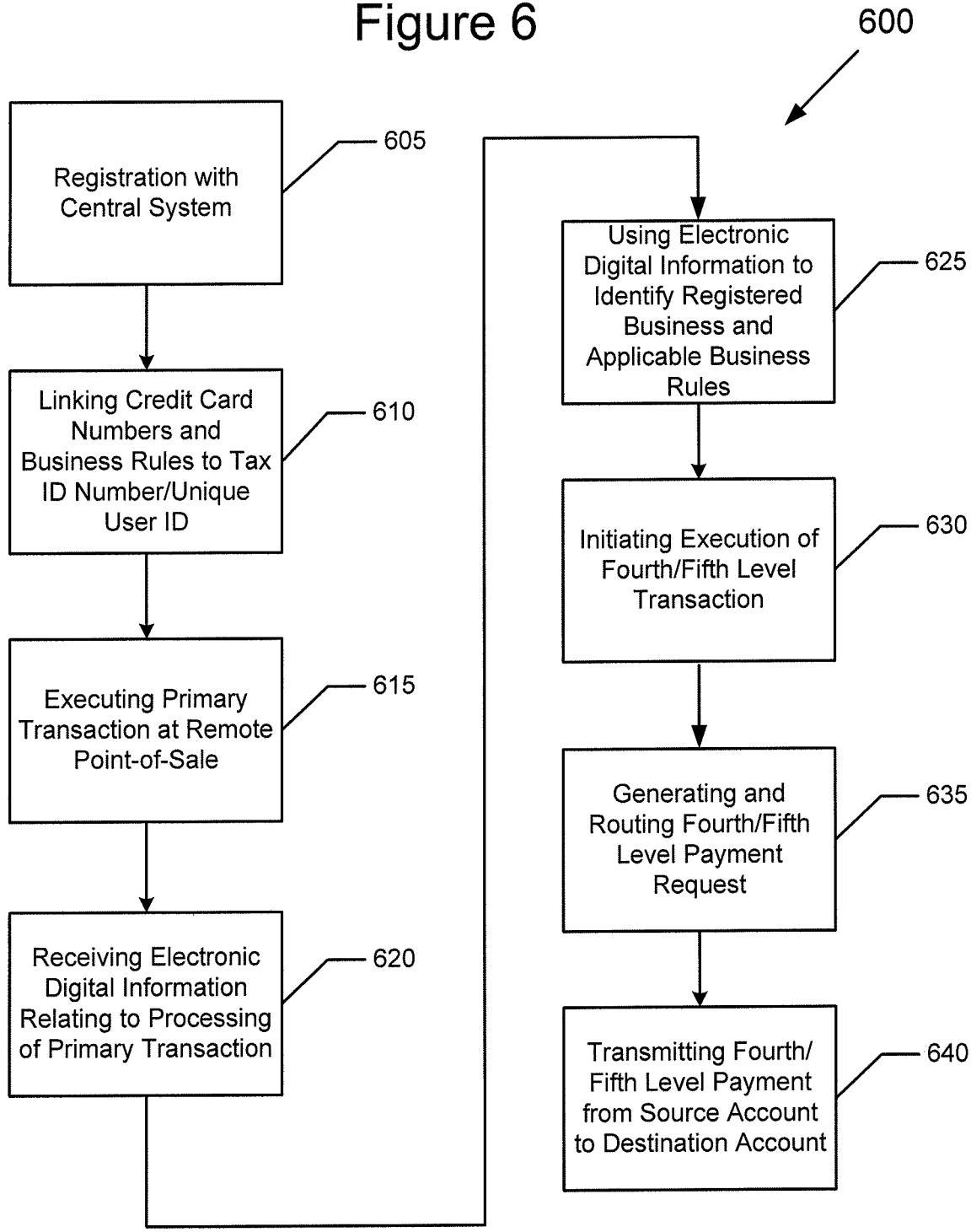

US 11,068,865 B2

SYSTEM AND METHOD FOR PROVIDING MERCHANT LOYALTY REWARDS

CROSS REFERENCE TO RELATED APPLICATION

This application is a continuation application of U.S. patent Ser. No. 14/243,071, entitled SYSTEM AND METHOD FOR PROVIDING MERCHANT LOYALTY REWARDS, filed Apr. 2, 2014, which is a continuation application of U.S. patent application Ser. No. 12/709,810, entitled SYSTEM AND METHOD FOR EXECUTING AN ELECTRONIC PAYMENT, filed Feb. 22, 2010, which is a continuation-in-part of U.S. patent application Ser. No. 12/499,421, entitled SYSTEM AND METHOD FOR EXECUTING A FINANCIAL TRANSACTION, filed Jul. 8, 2009, which claims priority to U.S. Provisional Application No. 61/157,097, entitled SYSTEM AND METHOD TO FACILITATE AN OPTIMAL MODEL OF CONSUMPTION, SAVINGS AND INVESTMENT, filed Mar. 3, 2009, the contents of each of which are incorporated herein by reference into the present application.

TECHNICAL FIELD

The present invention relates generally to electronic funds transfer network transactions and, more particularly, to the automated processing of electronic payments to third parties upon execution of electronic financial transactions.

BACKGROUND OF THE INVENTION

Generally, business entities and merchants are entitled to recover indirect taxes paid, to include, but not limited to, sales tax paid on purchased goods and services. Moreover, sales taxes or commodity taxes need to be defined and paid by business enterprises and merchants in the course of their commercial operations. Business entities and merchants therefore understand the burden in calculating and paying the requisite state and federal taxes every year. For example, proper and efficient fulfillment of these requirements can be subject to different effective tax rates by different levels of governmental jurisdictions. These varying tax rates applicable to goods and services are governed by the nature and purpose of the purchased, leased or other such nature of the goods and services. At the same time, federal and state government entities also appreciate the undue burden associated with ensuring that all business entities and merchants are in compliance with their tax requirements and have made all requisite payments in a timely manner.

While many systems exists that generally automate the process of calculating the required payment and recovery of taxes, business entities, merchants as well as government entities would value a system that automates the timing in a manner in which taxes are paid, but at the same time, maintaining some personalized control over how such taxes are paid.

Furthermore, in today's ever-growing e-commerce community, there are many circumstances where a merchant or business will contract with a third party entity such as Google®. For example, internet search engines currently derive the vast majority of their revenues from an advertising based business model. However, given the recent downturn in economic conditions, such business models may be at risk since businesses and/or merchants continue to reduce their advertising expenditures. Accordingly, an alternative business model is needed whereby search engines can derive a commission which may be based upon an actual financial transaction between a merchant/business and its customer(s). Merchants and businesses would therefore further value a system that enables them to automatically schedule payments to a third party entity such as Google®.

SUMMARY OF THE INVENTION

Accordingly, the present invention relates to a computer-implemented system and method for processing an electronic payment to a third party, such as a tax payment or a commission. The system and method provides for storage of customizable business rules, which are set by a user, a merchant, a business, a government agency and/or another third party entity. Upon receipt of electronic digital information relating to a financial transaction between a merchant and/or business and one of its customers, the system and method initiate execution of a payment to a third party, such as a government entity or non-government third party entity, in which the automatic electronic payment is controlled by the customizable business rules.

By controlling the electronic payments through customizable business rules, the user, merchant, business, government agency and/or other third party entity, can specify, among other things, the timing of the payment, the amount of the payment, and the destination of funds of the payment. Such a system has global implications. For example, the government entity may desire to speed up or slow down the payments in the system. Customizable business rule enable the applicable government entity to either inject liquidity into the market by delaying receipts or withdraw liquidity by speeding up receipts. As a result, the present invention can be used effectively as a tool for macroeconomic management by enabling the authorities to set the time delay for payments and receipts on an ad hoc basis, thereby expanding or contracting money supply.

BRIEF DESCRIPTION OF THE DRAWINGS

FIGS. 2A & 2B illustrate a flowchart for a method for initiating execution of a second financial transaction in accordance with an exemplary embodiment.

FIG. 3 illustrates a flowchart for a method for initiating execution of a financial transaction in accordance with another exemplary embodiment.

FIG. 6 illustrates a flowchart for a method for initiating execution of a financial transaction in accordance with another exemplary embodiment.

DETAILED DESCRIPTION OF THE INVENTION

The following detailed description outlines possible embodiments of the proposed invention for exemplary purposes. The invention is in no way intended to be limited to any specific combinations of hardware and software. As will be described below, the inventive system and method triggers secondary and tertiary transactions by means of a series of payment instructions from an electronic funds transfer ("EFT") network to a central computer and database. The central computer and database collectively manage the distribution of funds according to customizable business rules defined by cardholders and merchants.

Figure 1:
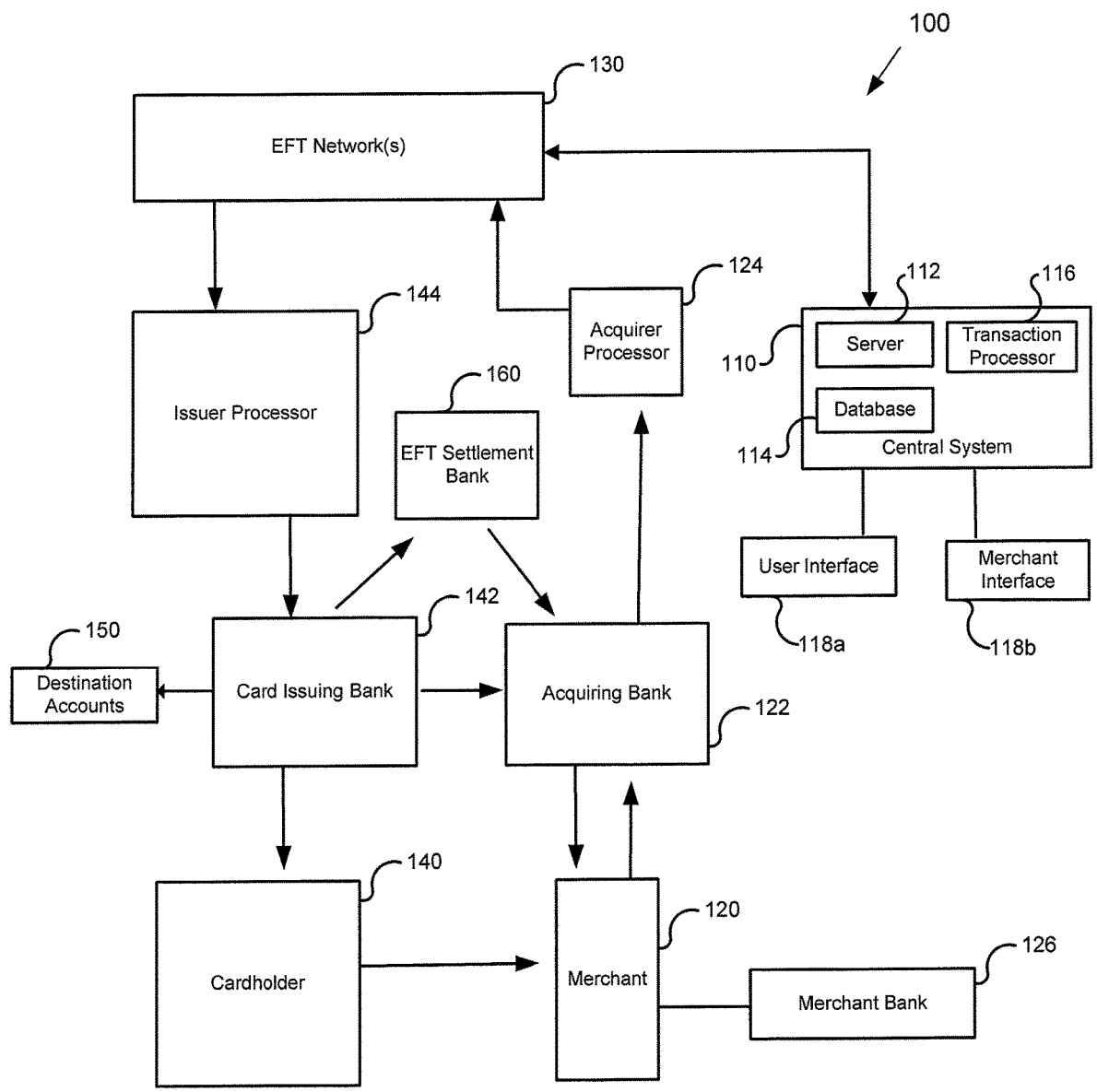
FIG. 1 illustrates a block diagram of the secondary financial payment system in accordance with an exemplary embodiment.

FIG. 1 illustrates a block diagram of the financial transaction network 100 in accordance with an exemplary embodiment of the present invention. Financial transaction network 100 is a system that links one or more EFT networks, users, merchants and financial institutions towards a common purpose of facilitating an optimal model of consumption, savings and investment. In essence, the inventive system and method establishes a symbiotic relationship among all entities by providing a methodology for habitual savings to the user while integrating merchant loyalty rewards. For avoidance of doubt, it is noted that the term "user" is used interchangeably with the term "cardholder" and/or "consumer" throughout this application.

As shown, FIG. 1 depicts an overall representation of the financial transaction network 100 that provides for a single or series of secondary and/or tertiary transactions, which are triggered by one or more primary transactions. Generally, a primary transaction is a conventional credit/debit card payment or the like, which is based upon standard authorization and settlement processes. The inventive system facilitates one or more secondary and/or tertiary transactions whose execution is prompted by the one or more primary transactions, but is otherwise independent of the primary transaction. It should be understood that the terms "primary", "secondary" and "tertiary" are used in this application in terms of sequence and not importance. For example, a "primary" transaction is a first transaction that triggers a secondary (i.e., second) transaction and/or tertiary (i.e., third) transaction. Furthermore, in other embodiments, the primary transaction triggers the secondary transaction, which, in turn, triggers the tertiary transaction or, in the alternative, the primary transaction triggers the tertiary transaction, which, in turn, triggers the secondary transaction.

The secondary and tertiary transactions are a single or series of independent payments initiated by the inventive system and mediated by the EFT card network(s), based upon user and/or merchant selected and controlled business rules. In the exemplary embodiment, a secondary transaction is a financial payment defined by a user and a tertiary transaction is a financial payment that is defined by the merchant. It should further be appreciated that business rules utilized by the inventive system are computerized processing statements that define or constrain some aspect of the processing of the secondary/tertiary transaction(s). The business rules are logical statements, customizable by both the user and merchant, that define how the secondary or tertiary payments are to be processed. For example, the rules may define the source account(s), destination account(s), the timing of the payments, etc. Further examples of the possible business rules will be discussed in detail below.

Central system 110 of FIG. 1 is configured to transmit and receive electronic digital data, via a transmission channel, switching service, modem or the like, to and from EFT network 130. EFT network 130 is provided by existing credit card providers to route digital data from banks, acquirers and/or issuers. FIG. 1 further illustrates merchant site 120, acquiring bank 122, acquirer processor 124, merchant bank 126, cardholder 140, card issuing bank 142, issuer processor 144, user-destination accounts 150, and EFT settlement bank 160.

In the exemplary embodiment, the secondary payments are made from card issuing bank 142 (or another source account as specified by the cardholder) and the tertiary payments are made from merchant bank 126 (or another source account as specified by the merchant) to user-designated accounts 150 whenever a primary transaction on a user's card is routed through the EFT network(s) 130. Although the secondary and tertiary transactions are triggered by the primary transaction, which occurs at merchant site 120, the actual processing and execution of the primary transaction at both the user side and the merchant side remains unchanged. As a result, there is no change in behavior for either cardholder 140 or merchant 120 after central system 110 has been integrated with an existing financial transaction network. Effectively, no additional processing costs would be incurred by the merchant, which could potentially dissuade implementation of the system by the merchant.

Central system 110 includes server 112, database 114 and transaction processor 116. It should be appreciated that in one embodiment a single computer can comprise one or more of these components. In alternative embodiments, however, these components are provided separately and coupled to one another for communication purposes, either locally or remotely. Server 112 further comprises all requisite hardware and software modules (not shown) to enable communication between central system 110 and remote entities, such as EFT network 130. These communication hardware components can include conventional I/O interfaces, such as modems, network cards, and the like. Such hardware components and software applications are known to those skilled in the art and have not been described in detail so as not to unnecessarily obscure the description of the invention herein.

In addition, server 112 further includes all hardware and software modules (not shown) that are necessary to provide a website portal for user interaction with central system 110. Specifically, it is contemplated that server 112 provides user interface 118a, via the website portal, that enables a user to register with central system 110 and predefine business rules. The inventive system is not limited to user registration via the system website. In alternative embodiments, central system 110 enables a user to register through a local bank or the like.

Utilizing user interface 118a, cardholder 140 can register one or more debit cards, credit cards, gift cards, prepaid cards, other electronic payment mediation services and devices such as mobile phones, SMS, SIM, RFI, and the like, with central system 110, which is configured to store this information in database 114. Database 114 may be any type of electronic storage medium. Central system 110 is further configured to generate and assign a unique user identification number ("ID") to the individual user 140. The unique user ID effectively links each of the registered cards to the particular user 140. As will become evident from the description below, one advantage in this regard is that a user is not required to use a single card only issued from a specific bank in order to utilize the inventive system and method. Rather, user 140 can designate any number and types of cards issued from any number of banks and vendors.

In an alternative embodiment, whenever a primary transaction is routed through an affiliated network, EFT network 130 will automatically trigger the generation of a unique user ID for cardholder 140 and establish a temporary user registration with central system 110. This step would apply for any user that has not yet registered with the system. As will be discussed below, once the temporary account is registered, the user will be contacted and prompted to confirm his or her participation in the inventive program.

In any event, once cardholder 140 has registered with the system and a unique user ID has been designated to cardholder 140, user interface 118a further enables the user to define business rules directing automated secondary payment to predetermined accounts 150 via a secure online control mechanism. In general, the predefined business rules specify the amount and destination of secondary transactions that will be automatically triggered following the successful authorization of a primary transaction at a remote point-of-sale, such as merchant site 120. In this regard, the business rules generally define the amount of the secondary transaction and the one or more secondary accounts 150 designated to receive the funds of the secondary transaction.

Based on the user's predefined business rules, one or more secondary transactions will be initiated by central system 110 to debit the user's source account and credit the specified destination account 150. More particularly, once central system 110 receives electronic digital information concerning details of a primary transaction executed at a remote point-of-sale (e.g., merchant site 120), central system 110 analyzes the electronic digital information to determine whether the customer is registered with the inventive system. This process can be performed by searching database 114 to identify whether the credit card number used in the primary transaction has been registered in database 114. If so, transaction processor 116 determines whether one or more secondary transactions are required based on the registered user's customized business rules. It should be appreciated that transaction processor 116 may comprise a business rules engine or the like to execute one or more of the customizable business rules in a runtime production environment. If specified by the customizable business rules, transaction processor 116 initiates execution of the secondary financial transaction. The actual processing of the secondary transaction will be described in more detail below.

In one embodiment, this process can be executed in real-time to coincide with the merchant transaction (i.e., the primary transaction) at merchant site 120. In an alternative embodiment, the secondary transactions can be batch processed if transactions are not processed directly through EFT network 130. Moreover, secondary payments may be paid individually or aggregated (in a separate account or otherwise), and transferred to the specified destination account 150 when certain thresholds are met. For example, if the funds are to be transferred to a specific brokerage account requiring a minimum balance, the business rules can be defined to delay the actual transfer of funds until a sum of the secondary payments accumulates to the threshold amount (e.g., $1000, etc.). The aggregation of required funds can occur at card issuing bank 142 or any other appropriate account, which may be defined by the user via the customizable business rules. One important aspect is that no secondary payments will be triggered if such a transaction would result in overdrawing of the user's source account or if a penal interest rate or charge is incurred on that account. It should be clear that while this predefined protective limit is not necessary to implement the inventive system, this feature has obvious benefits and can further be set up by either user 140 or automatically by central system 110.

Examples of the calculation of secondary payment amounts as defined by a user's customized business rules include a percentage of the primary transaction, rounding up the primary transaction to a user specified level, a predetermined lump sum, or the like. It is reiterated that while these payments may be calculated using different methods, each of these transactions is a separate payment that is processed and reported independently of the primary transaction.

Furthermore, maximum and/or minimum thresholds for the primary transaction may be set in order to ensure that specified primary transactions (e.g., transactions under $10) do not trigger a secondary transaction. In addition, user interface 118a enables the user to define daily, weekly, monthly, and/or annual limits. Effectively, where certain tax free savings schemes limit a user's contribution to a maximum amount within a given time period, such as a year (e.g., a personal retirement account), central system 110 is configured to enable users to contribute to such accounts without worrying that more than the permissible amount is invested for that statutory time period. In a further aspect of this feature, any amounts above the permissible tax threshold that are routed to the designated account would be automatically rerouted to temporary holding accounts or secondary destination accounts as directed by the user. Funds in a temporary account could then be transferred once the appropriate tax limits were released.

As should be understood, user interface 118a provides the cardholder with absolute control over destination accounts 150. Effectively, there is no involvement required from any third party such as issuing bank 142 of the user's credit/debit cards. Advantageously, changes to the respective internal system of issuing bank 142 are not required, and, therefore, third party errors can be eliminated when defining the secondary transaction process. It is noted that in alternative embodiments, the cardholder may utilize the inventive system in conjunction with a third party such as his or her primary bank to register and establish the business rules.

Similar to the website portal provided to the cardholder, server 112 is further configured to provide a website portal to facilitate merchant registration with central system 110. It should be clear, however, that the inventive system is not limited to merchant registration via the website portal. In alternative embodiments, the system enables a merchant to register through a local bank or the like.

Using merchant interface 118b, a merchant at merchant site 120, for example, registers their participation in the rewards system to offer tertiary payments in the form of monetized rewards. These monetized rewards are paid directly to each user's predetermined destination account(s) 150 following the criteria set forth by cardholder's predefined business rules. Effectively, central system 110 provides merchants with tools to configure the level of rewards for cardholders to foster customer loyalty. Advantageously, merchants would benefit from a potentially cheaper alternative provided by the system when compared with a merchant's own loyalty programs, which can often be expensive to establish and administer.

Merchant interface 118b is provided by server 112, enabling merchants to direct financial contributions to the user's savings to incentivize user loyalty and card preference. Based on the merchant's predefined business rules, a tertiary financial transaction will be initiated by central system 110 to debit the merchant's source account. More particular, once central system 110 receives electronic digital information concerning details of the primary transaction executed at a remote point-of-sale at merchant site 120, central system 110 analyzes the electronic digital information to determine whether the merchant's customer is registered with the inventive system. If so, and if the criteria defined by the merchant establishes that a tertiary transaction is to be processed, transaction processor 116 initiates execution of this tertiary transaction. It is noted that merchant site 120 can be a physical store or a merchant's website capable of execution of credit/debit card transactions or the like. Furthermore, it should be understood that while the tertiary transaction may be executed after execution of the secondary transaction in one embodiment, in an alternative embodiment, the tertiary transaction is triggered solely by the primary transaction.

By offering a tertiary payment, the merchant advantageously gets a complete customer view of value, rather than single card view. Customer loyalty is not tied into a single credit card; rather it is tied to the customer's identity since the customer can use any EFT payment network supported by the invention. For example, in one possible aspect, triggers can be set by merchants, via predefined business rules, that increase financial and non-financial incentives if the user provides the merchant with all of their business for a given good or service, or meets certain spending thresholds with the merchant. Customer spending, however, does not need to be executed using a single card, such as a rewards card or a gift card issued by the specific merchant.

In the exemplary embodiment, user participation needs to be instigated by the user via user interface 118a. However, in an alternative embodiment, cardholders are automatically enrolled in the merchants rewards program when they use their cards, even when they have not registered with central system 110. In one embodiment, the tertiary payments may be posted to a temporary account and the customer will be notified to confirm registration in the inventive system. This is facilitated by EFT network 130, making the growth of the reward program non-dependent upon user sign-up. Upon user acceptance, any temporarily posted payments will be forwarded to the relevant destination accounts 150 upon processing of the business rules as customized by the user during registration.

As should be apparent, merchants are provided with flexibility to define the calculation of tertiary payment accounts. For example, the merchant could offer tertiary payments in the form of a percentage of transactions; bonuses for meeting spending threshold, tiered rewards based upon timed spending criteria; discretionary or special promotions; and the like. Alternatively, merchants could offer non-payment tertiary rewards, such as Air Miles if the merchant is an airline or the like. In addition, merchant interface 118b enables the merchant to define prescribed ceilings for tertiary payments as well as means to target specific customer profiles. For example, it may be beneficial for merchants to offer increased rewards to bulk buying groups or to offer incentives for bulk purchasing. Alternatively, merchants may wish to provide additional incentives for customers to shop at certain times of the day/night which may help them to smooth traffic or increase traffic during slow periods. Furthermore, multiple merchants could jointly offer customer loyalty programs such as providing monetary rewards with other existing rewards schemes, such as Air Miles and the like.

It should be understood that central system 110 and/or transaction processor 116 can be implemented as a computer processing device, and in particular, any suitable device for performing computations in accordance with a computer program may be used. Examples of such devices include a personal computer, a laptop computer, a microprocessor, a programmable logic device, an application specific integrated circuit, or the like.

A recording media storing a computer program for accomplishing the above mentioned system and method may be accomplished by programming the applicable functions with a programming language readable by central system 110 and/or for transaction processor 116, and recording the program on a computer readable medium. Furthermore, server 112 can be equipped with a hard disk drive that may be employed as a recording media. It is also possible to accomplish the present invention by storing the above mentioned computer program on such a hard disk in server 112 and reading the computer program by other computers through a network.

It is also noted that the term "medium" includes, for instance, a disk shaped media such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program and/or data therein.

Referring now to FIG. 2A, a method is illustrated for executing a secondary financial transaction in accordance with an exemplary embodiment of the invention. Initially, at step 205, cardholder 140 registers with central system 110. As discussed above, registration may include inputting a plurality of credit card numbers, debit card numbers, and the like, as well as defining business rules for controlling processing of the secondary financial transaction. Next, central system 110 generates a unique user ID linking the plurality of card numbers and business rules to registered cardholder 140. At this point, cardholder 140 can begin utilizing the advantages provided by central system 110.

Specifically, at step 215, a primary transaction is executed at an existing point-of-sale. As noted above, a primary transaction is generally a conventional user transaction involving a credit card, debit card or the like. For example, at the time of purchase, cardholder 140 presents a card, which has been registered with the system, for payment at remote point-of-sale such as merchant site 120. In response, a terminal at merchant site 120 transmits electronic digital information representing the transaction details to acquiring bank 122 for processing. Acquiring bank 122 combines the transaction information into an authorization request message and transmits it to EFT network 130. As is known, many financial institutions such as acquiring bank 122 will hire a third party for more cost-effective bankcard processing. As such, in one embodiment, acquiring bank 122 relays the card details and transaction amount to acquirer processor 124 for generation of the authorization request message.

In either embodiment, after the authorization request message is routed through EFT network 130, the authorization request message is forwarded to issuing bank 142 for review. Specifically, issuing bank 142 is the bank that has issued the particular credit/debit card used by cardholder 140 for the primary financial transaction. Similar to acquirer processor 124, issuing bank 142 may also employ a third party, i.e., issuer processor 144, for processing of the authorization request message. Upon review, issuing bank 142 (or issuer processor 144) sends an authorization response to EFT network 130 to either approve or decline the transaction. This authorization response is then routed through EFT network 130, which forwards the authorization response to acquiring bank 122 (or acquirer processor 124). Acquiring bank 142 then transmits the result of the authorization request to merchant site 120. Settlement of the primary transaction follows as per conventional clearing and settlement cycles. For example, after receiving the result of the authorization request, merchant site 120 transmits the sales information on either a periodic or specified basis as a clearing message to acquiring bank 122 and/or acquirer processor 124. This information is then routed through EFT network 130 to issuing bank 142 and/or issuer processor 144. Upon receipt, the settlement obligations are calculated and the amount due is transmitted from issuing bank 142 to acquiring bank 122. In another embodiment, these funds can be routed through settlement bank 160, which can be any entity of the associated EFT network (e.g., MasterCard®, Visa®, etc.).

It is further noted that in one embodiment, EFT network 130 may provide stand-in processing facilities to renew and authorize the transaction. As is known, stand-in authorization may be used if a communication link is unavailable, or as a measure to save communication cost or time. Stand-in authorization is subject to the transaction amount being below agreed limits, known as floor limits, which are calculated based on the risk of authorizing a transaction offline.

Referring back to FIG. 2A, once the primary transaction is executed at step 215, central system 110 determines whether one or more secondary transactions are to be executed. As discussed above, secondary transactions are based on business rules formerly defined by cardholder 140 for cards that have been registered with central system 110.

Specifically, following the return of a transaction approved message from issuing bank 122 (or acquirer processor 124), EFT network 130 transmits electronic digital information representing an additional payment message to central system 110 at step 220. It should be understood that in an alternative embodiment, where EFT network 130 provides stand-in processing, EFT network 130 will also transmit the additional payment message to central system 110 if the result of the stand-in processing is an approved transaction. As will be discussed below, central system 110 utilizes details in this additional payment message for processing of one or more secondary financial transactions.

In another embodiment, central system 110 is configured to transmit the unique user ID and associated credit and/or debit card numbers to the associated EFT network (e.g., MasterCard®, Visa®, etc.) at the time user 140 registers with central system 110. As such, the respective EFT network 130 can store this information in its server. Accordingly, upon execution of a primary transaction at merchant site 120, EFT network 130 analyzes the electronic digital information concerning the authorization request against current reference data to ascertain whether the particular card has been enrolled in the scheme. If the card is enrolled, EFT network 130 will identify and add the corresponding user ID to the electronic digital information that is transmitted to central system 110. In yet another embodiment, EFT network 130 further removes all transaction data that is not necessary for execution of the secondary transaction before transmitting the data to central system 110.

In either case, once central system 110 receives the additional payment message, central system 110 uses the credit/debit card number provided in the additional payment message to identify the registered cardholder 140 (step 225). In particular, central system 110 cross-references the credit/debit card number with the information in database 114 to identify cardholder 140. Alternatively, if EFT network 130 has already identified the unique user ID, central system 110 utilizes the provided unique user ID to begin processing of the secondary financial transaction.

In order to initiate execution of the one or more secondary transactions, transaction processor 116 applies the modified business rules and generates a new payment authorization request message to effect the one or more secondary transaction (step 230). As discussed above, the business rules may define the bank identification number, such as the routing number and bank account number, for both the source account and destination account 150, as well as the value of the secondary financial transaction(s). At step 230, server 112 forwards the newly generated payment request message(s) to EFT network 130, which routes them to issuing bank 142 (or its issuer processor 144) of the user. It is noted again that EFT network 130 may provide stand-in processing facilities for processing of the payment request as discussed above.

Upon receipt of the payment request message(s), issuing bank 142 (or its issuer processor 144) sends an authorization response to central system 110 at step 235. If central system 110 receives an authorization acceptance response, system data in database 114 is updated for the cardholder. Issuing bank 142 then sends the one or more secondary payment(s) to destination account(s) 150 as specified by the user-customized business rules (step 240). It is noted that the exemplary embodiment employs issuing bank 142 as the source account of the secondary transaction, however, in alternative embodiments, the source account can be any account as specified by the user, via the predetermined business rules.

Alternatively, if issuing bank 142 denies authorization and transmits an authorization message denied response to central system 110, a system alert is generated by central system 110 and associated information is transmitted back to the user's account defined in database 114 to advise the user of the failed secondary transaction. Central system 110 may further provide details to the user concerning the failed transaction, for example, if the designated destination account 150 has been closed or the like.

Figure 2B:
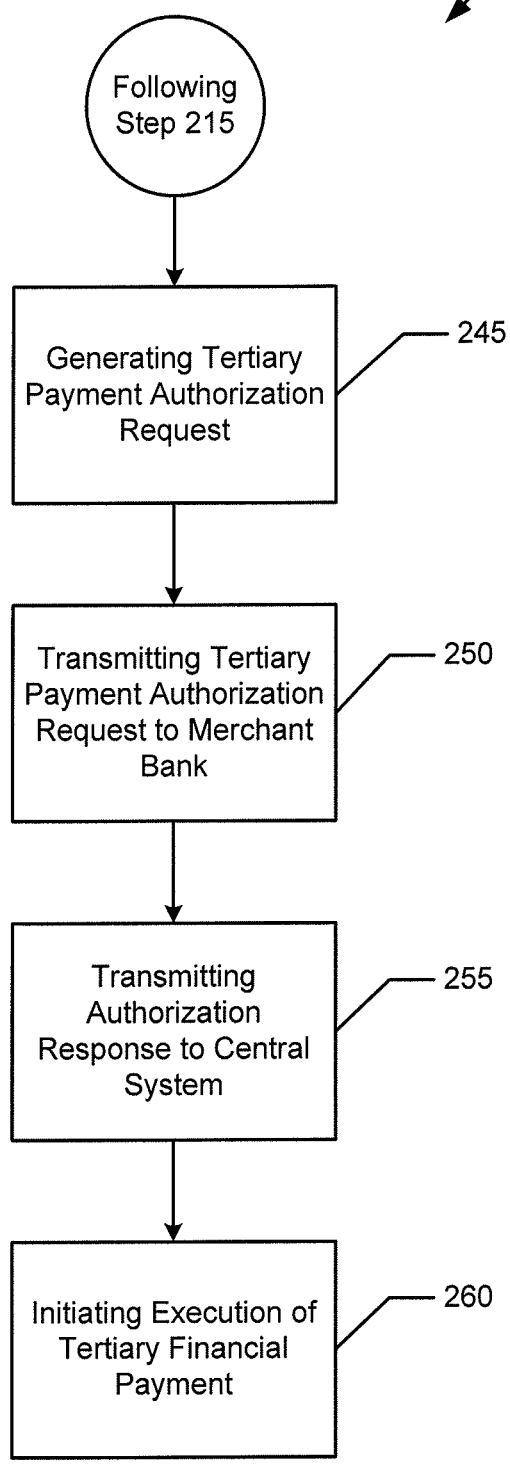

A further embodiment of the invention is illustrated in FIG. 2B. As discussed above, merchants are provided merchant interface 118b, via the website portal, enabling them to define business rules for execution of one or more tertiary transactions. Specifically, merchants are provided tools to define business rules that incentivize and reinforce customer loyalty. As noted above, a merchant may wish to provide certain financial incentives for a customer to purchase all of its goods from that merchant or to meet certain spending thresholds at that merchant's site(s) 120.

As shown, FIG. 2B is a continuation of the method shown in FIG. 2A. Specifically, once the primary transaction is completed at step 215 (shown in FIG. 2B), central system 110 determines whether one or more tertiary transactions are to be executed, by evaluating the merchant-defined business rules. As discussed above, server 112 provides a website portal with merchant interface 118b enabling merchants to predefine business rules specifying merchant loyalty rewards in the form of tertiary financial payments.

In particular, central system 110 applies the customized business rules previously defined by the card holder and the merchant to produce a new payment authorization request message at step 245. In particular, central system 110 is configured to evaluate the electronic digital information representing the details of the primary transaction (e.g., value of the transaction, good(s) purchased, etc.) and determine whether the merchant 120 at the remote point-of-sale has defined business rules that establish whether a tertiary transaction should be executed based on the details of the primary transaction.

If applicable, at step 250, central system 110 forwards a tertiary payment request to EFT network 130 which in turn routes the message to merchant bank 126. It is noted that in an alternative embodiment, EFT network 130 provides stand-in processing facilities. It is further noted that the invention is in no way intended to be limited to a single tertiary payment. Rather, central system 110 is capable of generating and transmitting multiple payment authorization request messages if so defined by the relevant business rules.

Upon receipt of tertiary payment request, merchant bank 126 sends an authorization response to central system 110 (step 255). If the tertiary transaction is approved by merchant bank 126, central system 110 updates user data stored in database 114. Furthermore, merchant bank 126 transmits the one or more tertiary payments to the one or more predefined destination accounts 150 as defined by the customer's predefined business rules (step 260). Similar to execution of the secondary payment as discussed above, if the authorization payment request is declined, central system 110 is configured to generate an alert and transmit corresponding account information to the customer's and merchant's system accounts in database 114 to advise of outstanding sums to reconcile.

FIG. 3 illustrates a flowchart for a method 300 for initiating execution of a financial transaction in accordance with another exemplary embodiment. Specifically, this embodiment is utilized when a user has not yet registered with the inventive system. As shown, initially at step 305, a primary transaction is executed at an existing point-of-sale. Once EFT network 130 routes electronic digital information to central system 110, central system 110 determines at step 310 whether the customer has previously registered with the inventive system. If the customer has already registered, secondary and tertiary transactions can be executed as discussed above with respect to FIGS. 2A and 2B and respective steps 220-260. In contrast, if the user has not yet registered, central system 110 generates a temporary unique user identification for the customer (step 315).

At step 320, a tertiary payment authorization request is generated by central system 110, which in turn, prompts a source account defined by the merchant, such as merchant bank 126, to post the one or more tertiary payments in a temporary holding account. At step 330, central system 110 contacts the user, via any standard method of communication such as email or text messaging, to prompt the user to confirm registration with the inventive system. At that point, the user can register with the inventive system and define user customizable business rules via user interface 118*a*. Moreover, a permanent unique user identification will be assigned to the user linking any credit card numbers, debit card numbers or the like with the customizable business rules. Once registered, an authorization response is transmitted at step 335 from central system 110 to merchant bank 126, via EFT network 130. The authorization response can include the routing number and bank account number of desired destination account 150. The authorization response in turn initiates transfer of the one or more tertiary accounts from the temporary holding account to the user's destination account 150 as defined by the business rules (step 340). Afterwards, any primary transactions executed by the newly-registered customer trigger secondary and/or tertiary transactions in accordance with the foregoing aspects of the present invention (see steps 220-260, for example). It should be clear, however, that if the user elects not to register with the system, the tertiary payment stored in the temporary holding account will be returned to the merchant's account at merchant bank 126.

As should be understood from the discussion above, all primary, secondary and tertiary transactions are mediated by EFT network 130. Conceived as a single global network, the movement of transaction payments from source accounts to destination accounts is controlled at the EFT network level, not by the issuing bank 142 and/or merchant bank 126. As a result, central system 110 can be integrated with the system of each card issuer as the payments are transferred over EFT network 130, using existing authorization and settlement processes. In this embodiment, no issuing bank will have any integration issues relating to this service, effectively reducing implementation costs to users and/or merchants. Furthermore, because the service uses EFT network 130, there will be minimal integration or development between payment network stakeholders.

While the exemplary embodiment discloses triggering a secondary financial transaction based on electronic digital information concerning details of a primary financial transaction, in another embodiment, the user's unique ID is distributed between all stakeholders in financial transaction network 100. Specifically, central system 110 may interact with any entity that is part of the transaction flow, including, but not limited to participating merchants, EFT networks, financial institutions, regional processors, national processors, issuer processors, acquirer processors, merchant acquirer processors, multiple EFT networks, transaction services providers and or national, regional or global payment schemes.

By providing the unique ID to merchants, for example, merchants can identify the customer irrespective of the particular card used for the transactions. For instance, when a user transacts at merchant site 120, EFT network 130 inserts the ID number into the authorization response message. In situations where the merchant does not authorize a transaction through EFT network 130, EFT network 130 will insert the ID during the clearing and settlement process, thus ensuring that every transaction is populated with an ID. In the preferred embodiment, the EFT network will ensure that every cleared and settled transaction is populated with an ID if the transaction was generated by a registered card. In such an embodiment, the merchant then accepts the user ID number at authorization, or after clearing and settlement processes.

While the exemplary embodiment of the invention contemplates secondary and tertiary transaction being triggered from conventional credit/debit card purchases, in an alternative embodiment, secondary payments may be triggered when payments arrive into a user-specified account. For example, a user can define business rules such that his or her salary serves as the primary transaction. In this regard, the user can register issuing bank 142 in database 114 as the source account. Each time his or her salary is deposited at issuing bank 142, the deposit triggers a secondary transaction in accordance with the inventive features discussed above.

While the exemplary embodiment of the invention contemplates secondary and tertiary transaction being triggered from conventional credit/debit card purchases, in an alternative embodiment, secondary and tertiary transactions can be triggered from any mobile electronic payments device, ATM flows and the like.

In a further aspect, the user can define any number of source and destination accounts in accordance with the present invention. In one aspect, a user can define one or more investment accounts as the source and/or destination accounts. This offers financial institutions the opportunity to market their products and services on the user interface providing expansion of their revenue base. In another aspect, a user may direct third party investment accounts as the destination accounts. For example, several grandparents could contribute to a grandchild's college saving account or the like, via secondary payments.

As discussed above, the inventive system permits users to contribute set amounts to certain type of accounts, such as retirement accounts. For example, a user may wish to provide for a full IRA allocation over the course of the taxable year. More particularly, a user under 50 years of age may wish to contribute a maximum dollar amount according to the prevailing rules and regulations. As such, central system 110 is configured to provide guidance on the secondary payments necessary per transaction to ensure that the client remains on track over the course of the financial year. Specifically, if the client is ahead or behind their goal, central system 110, via user interface 118*a*, is configured to propose business rule changes to get back on track.

In accordance with this feature, destination accounts defined by the user can further include debt management repayment account, and the like. For example, the user could direct that a portion or all secondary and tertiary payments be used toward debt settlement. This functionality would assist those customers who are heavily in debt to make small regular affordable contributions to reduce their outstanding debt. Creditors and debtor could further establish agreements such that a percentage of funds from secondary and/or tertiary payments are used to repay outstanding balance. This feature may be especially useful to organizations that have lent money to customers on an unsecured basis and might otherwise have to write off the loans.

In another embodiment of the invention, user accounts of the inventive system may be integrated with other electronic payment platform. In one aspect of this embodiment, central system 110 is integrated with mobile phone platforms enabling users to make discretionary one-off contributions using their mobile phones. In yet a further aspect, mobile phone users can define rules linking bill payments and/or unused/overused allowances. For example, mobile phone companies can reward their clients by providing a tertiary payment/reward for those clients exceeding the minutes permitted by their mobile phone contract. Alternatively, mobile phone companies can provide partial rebates, rewards or other tertiary payments to customers who have not used their full minutes allocation in order to prevent them from "trading down" their existing contract.

In yet another aspect, independent financial advisors could define their clients' accounts as destination accounts 150, such that funds may be routed accordingly. As such, existing account holders of third party financial intermediaries or institutions can use the system to add to their existing savings and investment accounts. In this embodiment, the owner/manager of central system 110 can require a percentage of the up front payment as well as a percentage of the annual trail commission based on assets under management.

In a further embodiment, the owner/manager of central system 110 is provided with a number of revenue generating models based on cardholder and merchant use. For example, the inventive system may include a fixed or percentage fee levied on all secondary and tertiary transactions; participation fees for all cardholders; fees for any ancillary products or services selected by the cardholder; commissions due on assets under management; Annual Management Charge for assets under management; merchant participation fees; licensing fees for third party use of the system; advertising revenue generated by the website portal; and the like.

In a further aspect of the invention, because each primary, secondary and/or tertiary transaction is processed as a separate transaction, the transactions are also reported to the user as separate transactions. As such, the user payment amount for the primary transaction exactly matches the amount for the goods and services in which case there is therefore no ambiguity over excess amounts. Moreover, each of the secondary and/or tertiary payments appears as a separate transaction on credit/debit card statements, resulting in absolute clarity in the amount deposited in the statements of destination accounts 150. Effectively, the user is provided with transparent online reporting and management such that all credits and debits can be easily tracked for tax and accounting purposes and the like. In a further aspect of this embodiment, the inventive system provides reporting of secondary and tertiary transactions to a user via short message service (SMS) and/or email. Furthermore, via business rules, a user can manage their accounts by defining trigger information such that they receive notifications when their accounts cross certain spending or savings/investment thresholds.

The inventive system, in combination with EFT network(s) 130, offers the service to users under a range of suitable product offerings for their secondary payments. Such secondary payment may include savings and investment products, tithing & charitable offerings, loans and other financial products, and the like. For example, a credit card company could extend its business to replace hire purchase (HP) contracts in some developing economies and thereby encourage both the transition to the use of cards over 'cash' as well as increase transaction volume.

It is further noted that in some conventional transaction systems, in regions or geographies where bi-lateral agreements exist between issuing banks and merchants, or in the case of private label processing, the employed EFT network(s) may not see every transaction. According to another aspect of the invention, issuing banks 142 and/or issuer processors 144 who participate in the inventive program will allow EFT network 130 to receive transaction information and can support the debit and credit of funds through EFT network 130, irrespective of the geographic location of cardholder 140 and destination account 150 for the funds.

In a further aspect of the invention, individual issuing banks 142 often only offer a product to their existing customer base if they are required to verify data pertaining to the user for various regulatory and risk management reasons such as anti-money laundering. Accordingly, central system 110 or EFT network 130 provides a means to verify user data directly with financial institutions through existing validation processes (Address Verification, Card Verification e.g. CSC/CVV/CVVC/CVC/V Code) or enhanced services such as two-factor authentication (e.g., prompt and response, mother's maiden name, favorite pet, etc.) in order to be able to make the service available to all card users that register with central system 110. Moreover, central system 110 can further enable registration covering all "know your customer" (KYC) policies using a single click account opening. Additional embodiments could enable single click links for tax and regulatory information to enable expansion of destination account and associated services.

Figure 4:
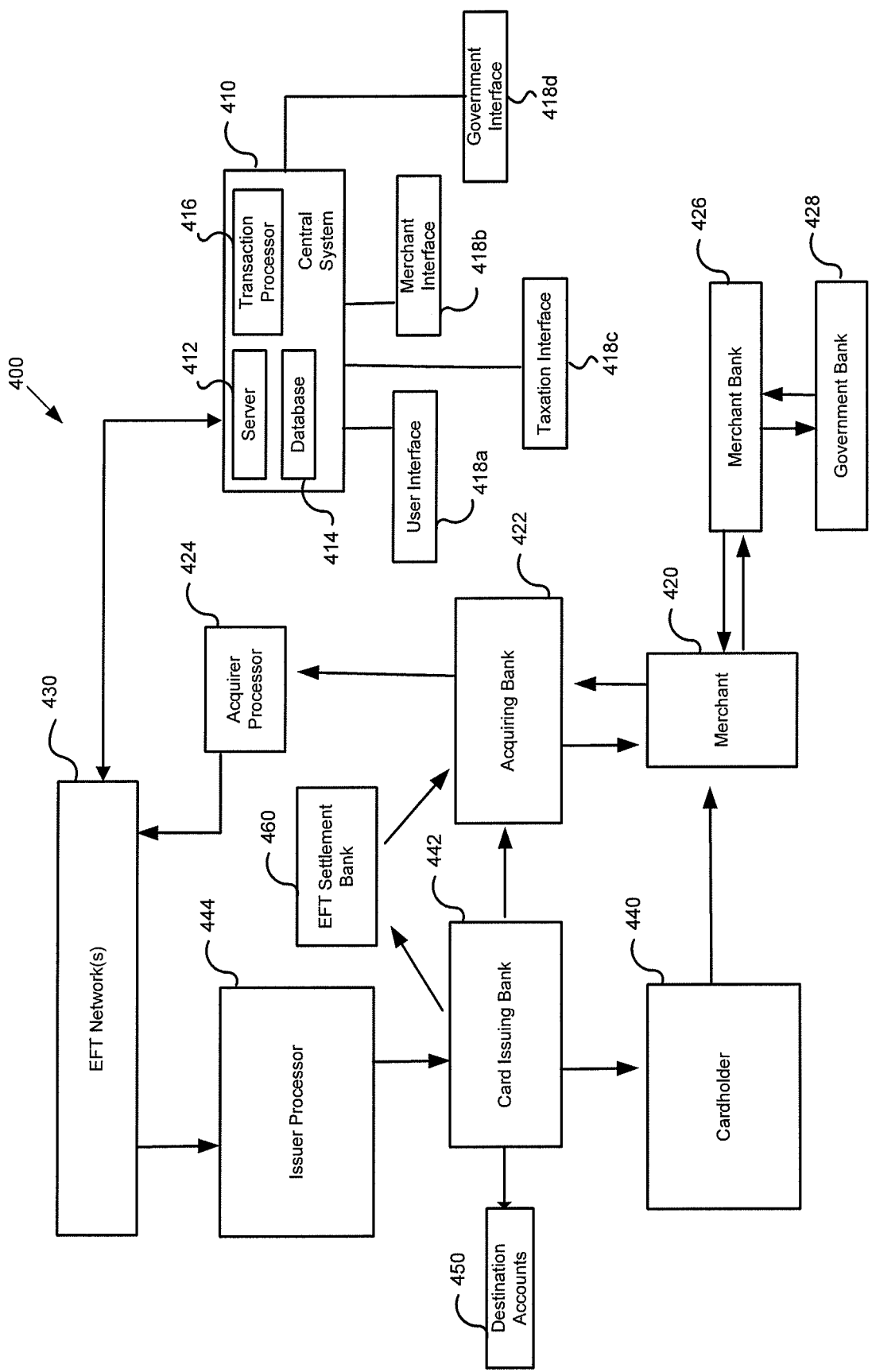
FIG. 4 illustrates a block diagram of the financial payment system in accordance with another exemplary embodiment.

In accordance with the foregoing embodiments, FIG. 4 illustrates another exemplary embodiment that provides a further application in the area of taxes. For example, such taxes may include state, federal and value added taxes ("VAT") as well as gasoline taxes, airline duties, green taxes, and the like. More particularly, this embodiment provides for storage of customizable business rules, which are set by, among others, businesses/corporations/merchants and state and federal government entities. Upon receipt of electronic digital information relating to a primary transaction, the system of FIG. 4 initiates execution of one or more fourth level transactions (tax payments), which are controlled by the customizable business rules. In a similar manner as discussed above, these fourth level transactions are processed independently of the primary transaction. It should be understood that the term "fourth level transaction," similar to "secondary" and "tertiary," is used in this application in terms of sequence and not importance. For example, a "primary" transaction is a first transaction that triggers a secondary (i.e., second) transaction, a tertiary (i.e., third) transaction, and/or a fourth level transaction.

As shown, FIG. 4 illustrates a block diagram of a financial transaction network 400 in accordance with this embodiment of the present invention. As shown in FIG. 4, some of the elements of financial transaction network 400 overlap with those elements employed by the financial transaction network 100 described above with respect to FIG. 1. It is noted that while these overlapping elements are not described in detail below, it should be understood that these components maintain the same functionality and structural features as the respective components illustrated in FIG. 1 and described above. For example, financial transaction network 400 comprises central system 410, which includes server 412, database 414 and transaction processor 416. It should be clear that these elements are the same as those respective elements described above (i.e., server 112, database 114 and transaction processor 116) with respect to FIG. 1. Furthermore, central system 410 is configured to transmit and receive electronic digital data, via a transmission channel, switching service, modem or the like, to and from EFT network 430. EFT network 430 is provided by existing credit card providers to route digital data from banks, acquirers and/or issuers. Moreover, FIG. 4 illustrates merchant site 420, acquiring bank 422, acquirer processor 424, merchant bank 426, cardholder 440, card issuing bank 442, issuer processor 444, user-destination accounts 450, and EFT settlement bank 460.

Further, as shown in FIG. 4, multiple interfaces are provided that enable different entities to register, via website portals, with central system 410 and predefine business rules. These interfaces include user interface 418a, merchant interface 418b, taxation interface 418c and government interface 418d. It should be understood that the inventive system is not limited to registration via the system website and in alternative embodiments, each respective entity can register with central system 410 through a local bank, third party vendor, or the like. Also, as shown in FIG. 4, financial transaction network 400 further comprises government bank 428, which is communicatively coupled to merchant bank 426. As will be explained in detailed below, merchant bank 426 (or another source as specified by the merchant), upon authorization, transmits/receives a fourth level payment(s) to/from government bank 428 based on the customized business rules, whenever a primary transaction is executed on a user's card and routed through EFT network(s) 430. However, even though the fourth level transaction(s) are triggered by the primary transaction, the actual processing and execution of the primary transaction at both the user side and the merchant/business side remains unchanged. As a result, there is no change in behavior for either cardholder 440 or merchant 420 after central system 410 has been integrated with an existing financial transaction network. Effectively, no additional processing costs would be incurred by the merchant 420, which could potentially dissuade implementation of the system by the merchant.

The system shown in FIG. 4 can be effective for any type of financial transaction, whether it is a payment made electronically, by check, cash or any other alternative such as mobile. As will be described below, the inventive system and method triggers fourth level transactions by means of a payment instruction. In one embodiment, this payment instruction is sent from EFT network 430 to a central system 410, which includes database 414. Central system 410 and database 414 are configured to collectively manage the distribution of funds according to customizable business rules defined by government, merchants/businesses and cardholders via the respective interfaces 418a-418d.

Fourth level transactions consist of state, federal, VAT and other consumption related taxes as well as government-issued tax rebates that arise based on a financial transaction, for example, at a point-of-sale. Generally, relevant local, state, federal or other government entities may establish rules relating to consumption tax rates from time to time. In accordance with the exemplary embodiment, server 412 provides a website portal with government interface 418d that is configured to enable a government entity to register with central system 410 and predefine business rules. In this embodiment, the customizable business rules can relate to the timing of payments, the amount of payments, the destination of funds and the like. Furthermore, server 412 provides a website portal with taxation interface 418c that is configured to enable merchants and businesses to register payment cards and other relevant accounts with user customized business rules, such that central system 410 and database 414 can process the payment/receipt of relevant consumption taxes according to the established rules based upon sales receipts or purchase transactions. It is noted that the terms "merchant" and "business" are used in accordance with their common definition. As such, both merchants and businesses are capable of performing all the same steps such as defining tertiary payments through merchant interface 418 and fourth level payments (i.e., tax payments) though taxation interface 418c.

More particularly, using taxation interface 418c, merchants and businesses can register one or more of their business payment cards (credit cards, debit cards, prepaid cards) and other electronic payment mediation services and devices such as mobile phones, SMS, SIM, RFI, and the like, with central system 410, which is configured to store this information in database 414. Central system 410 is further configured to assign the government issued tax identification code to the business in order to trigger immediate tax rebates on business purchases. In this way, businesses can receive timely rebates on any of their business related purchases made using these registered payment methods. In one aspect of this embodiment, each merchant or business may be linked to its parent company taxation interface 418c such that payments and receipts can be managed more centrally, depending on the tax status or the individual and group of companies.

Based upon the merchant/business/government defined business rules, one or more fourth level transactions will be initiated by central system 410 to debit the merchant/business/government source account and credit the merchant/business/government destination account whenever a primary financial transaction is undertaken at a point-of-sale. In one embodiment, this transaction is processed in real time to coincide with the merchant transaction (i.e., the primary transaction) at merchant site 420. In an alternative embodiment, the fourth level transactions can be batch processed if transactions are not processed directly through EFT network 430. One important aspect is that no fourth level payments will be triggered if such a transaction would result in overdrawing of the merchant's or business's source account or if a penal interest rate or charge is incurred on that account. Moreover, these payments can be paid individually or aggregated (in a separate account or otherwise), and transferred to the specified destination account (e.g., at merchant bank 426 or government bank 428) subject to certain specified thresholds or time delays. For example, in one aspect, the merchant or business may desire to allocate the sum of tax payments due, but at the same time, only pay these taxes on their actual due date. In this case, the fourth level transactions can be made to a temporary holding account or a secondary destination account as directed by the user and then transferred to government bank 428 upon their due date. In a further aspect of this feature, the government entity may desire to speed up or slow down the payments in the system. The customizable business rules enable the applicable government entity to either inject liquidity into the market by delaying receipts or withdraw liquidity by speeding up receipts. As a result, this embodiment can be used effectively as a tool for macroeconomic management by enabling the authorities to set the time delay for payments and receipts on an ad hoc basis, thereby expanding or contracting money supply.

In one embodiment, based on the primary transaction, the amount of tax arising is calculated by central system 410 utilizing the previously customized business rules stored within memory 414 and certain information that is generated automatically from or input manually into the payment device (credit card terminal for example) relating to the primary transaction, such as, tax codes. In an alternative embodiment, the merchant's/business's own point-of-sale hardware and software may generate the payment amount required for a fourth level transaction and provide this information to central system 410. The second embodiment provides the advantage of handling relevant taxes regardless of whether the primary financial transaction is made by payment card, cash, check or the like. In a further embodiment, where cardholders are not required to pay tax or should receive a tax rebate on their expenditure, for example when shopping overseas, the system is able to identify and rebate the tax paid at the point-of-sale immediately back to the cardholder, either directly from the merchant or from the central government.

One advantage from the exemplary system is that state, federal and international governments will benefit from automation of the currently manual process and the timely receipt of funds. In one embodiment, the invention can be used to trigger the payment and receipt of taxes from an initial point-of-sales transaction, regardless of how the payment is made, such that it can be comprehensive for all consumption taxes, leaving only modest reconciliation at the end of the reporting period. Furthermore, the net result of applying the invention in this way is that the time period before receiving tax payments to state, federal and international governments will necessarily be reduced. As a result, outstanding government debt balances will be lowered, effectively reducing the interest costs of these and benefitting the end consumer and corporate with a lower effective rate of taxation.

Figure 5:
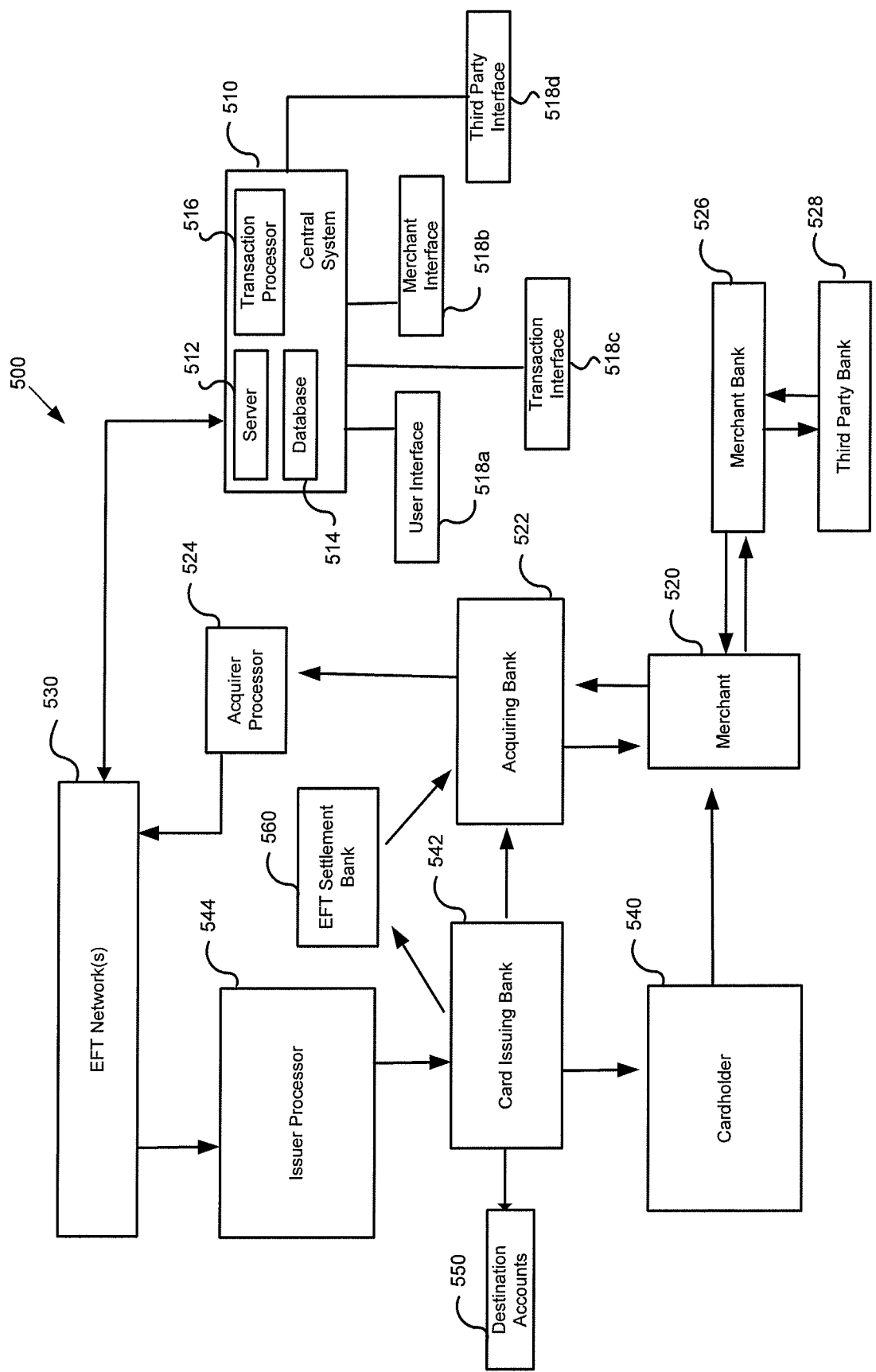
FIG. 5 illustrates a block diagram of the financial payment system in accordance with another exemplary embodiment.

FIG. 5 illustrates a further embodiment of the invention. As shown, FIG. 5 provides a block diagram of a financial transaction network 500 in accordance with this exemplary embodiment. The general concepts employed by financial transaction network 500 are similar to those discussed above with respect to financial transaction network 400. Namely, both embodiments facilitate financial relationships between businesses/merchants and one or more third parties. However, as explained above, FIG. 4 provides an application in the area of tax payments enabling a business or merchant to make automated tax payments to a third party such as state and/or federal government entities. Alternatively, FIG. 5 illustrate financial transaction network 500 that enables a business or merchant to automatically schedule payments to a third party entity such as Google® or the like. As will be explained below, the third party entity in this embodiment can be any party designated by the business or merchant to receive a financial payment, such as a commission or fee, in response to a primary financial transaction executed by the business's or merchant's customer.

In today's ever-growing e-commerce community, there are many circumstances where a merchant or business will contract with a third party entity such as Google®. For example, internet search engines currently derive the vast majority of their revenues from an advertising based business model. However, given the recent downturn in economic conditions, such business models may be at risk since businesses and/or merchants continue to reduce their advertising expenditures. Accordingly, financial transaction network 500 provides an alternative business model whereby search engines, by way of example, can derive a commission which may be based upon an actual financial transaction. Specifically, using financial transaction network 500, businesses and/or merchants can predefine customizable business rules such that when a user/customer is routed to the business's/merchant's website through the third party search engine, a commission is paid from the business/merchant to the third party entity when the user/customer executes a financial transaction (e.g., a purchase order for the business's/merchant's goods or services). By doing so, if the business/merchant has arranged for any fees or commissions to be payable to such third parties in lieu of introductory and/or advertising fees or the like, these commissions and fees are automatically triggered by the primary financial transaction. As a result, search engines, such as Google®, can employ a new layer of filtering their search by extending it to the amount of commission that is derived from delivering a customer to a merchant/business website.

In particular, the exemplary embodiment shown in FIG. 5 provides for storage of customizable business rules, which are set by, among others, businesses/corporations/merchants and third party entities. Upon receipt of electronic digital information relating to a primary transaction, the system initiates execution of one or more fifth level transactions (third party payments), which are controlled by the customizable business rules. In a similar manner as discussed above, these fifth level transactions are processed independently of the primary transaction. It should be understood that the term "fifth level transaction," similar to "secondary," "tertiary," and "fourth level" is used in this application in terms of sequence and not importance. For example, a "primary" transaction is a first transaction that triggers a secondary (i.e., second) transaction, a tertiary (i.e., third) transaction, a fourth level transaction and/or a fifth level transaction. Accordingly, it should be clear that a primary financial transaction can automatically trigger both a fourth level payment (i.e., a tax payment) as well as a fifth level payment (i.e., a payment to a third party vendor), for example.

As shown in FIG. 5, many of the elements of financial transaction network 500 overlap with those elements employed by the financial transaction network 400 described above with respect to FIG. 4. Consequently, these elements also overlap with those respective elements employed by financial transaction network 100 described above with respect to FIG. 1. It is noted that while these overlapping elements are not described in detail below, it should be understood that these components maintain the same functionality and structural features as the respective components illustrated in FIGS. 1 and/or 4. As further shown in FIG. 5, multiple interfaces are provided that enable different entities to register, via website portals, with central system 510 and predefine business rules. These interfaces include user interface 518a, merchant interface 518b, transaction interface 518c and third party interface 518d. Also, financial transaction network 500 further comprises third party bank 528, which is communicatively coupled to merchant bank 526. Merchant bank 526 (or another source as specified by the merchant and/or business), upon authorization, transmits a financial payment(s) to third party bank 528 based on the customized business rules, whenever a primary transaction is executed and routed through EFT network(s) 530.

Using transaction interface 518c, merchants and/or businesses can register with central system 510, which is configured to store this information in database 514. Transaction interface 518c further enables merchants and/or businesses to set customizable business rules that define how the fifth level payments are to be processed. For example, the rules may define the source account(s) (e.g., merchant bank 526), destination account(s) (e.g., third party bank 528), the timing of the payments, etc. Moreover, third party interface 518d is configured to enable a third party entity (such as Google®) to register with central system 510 and set customizable business rules. As such, both the business/merchant and the third party entity can define applicable business rules facilitating the automatic payment of a commission or fee as discussed above.

As a result, the exemplary embodiment illustrated in FIG. 5 provides a system enabling automated triggering and payment of third party fees that may be payable in lieu of a financial transaction. It should be clear that financial transaction network 500 can otherwise employ and offer the same advantages described above with respect to the embodiments illustrated in FIGS. 1-4. It should further be understood that while the exemplary embodiment is described involving a search engine such as Google®, financial transaction network 500 enables automatic payments to be triggered between a business or merchant and any applicable third party entity not limited to search engines. By enabling an instant reconciliation, payment can be automated and can lead to increased productivity and offer a range of benefits to parties to the transaction.

One advantage of this system is that it can reduce the up-front costs of customer acquisition for merchants. Under the existing operating model, merchants/businesses currently have to pay considerable up-front fees in order to generate traffic to their websites from search engines. In most cases, advertising fees are payable based on key advertising words in order that a merchant/business may appear higher up the list in search results. In other cases merchants/businesses pay search firms a fixed amount for the number of clicks on a merchant/business website which can be open to abuse. Furthermore, it is generally appreciated that in most instances, the user undertaking the search looks only at the first one or few pages and that the majority of search result data can be considered to be unqualified.

Under the conventional operating model, despite the fact that there is no guarantee of a financial transaction, the merchant may currently still pay significant fees to the search engine for customer traffic. Financial transaction network 500 provides a differentiated revenue model whereby a merchant/business effectively only pays the third party entity if a customer actually makes a purchase transaction such that any payment made by the merchant to the search engine is dependent upon a transaction driven outcome. As a result, financial transaction network 500 provides the ability to make the search results much more relevant to the particular user by offering an additional layer of filtering to the existing process based upon actual transactions that are triggered (online and offline). As such, search results are filtered for transaction relevance and result in a smaller number of more relevant searched results being generated.

As a further consequence of controlling search results based on relevant transaction data, financial transaction network 500 facilitates the creation of online communities (and/or social networking) based upon relevant completed financial transactions as well as stated user interests. By way of example, the development of online communities enables business and merchants to target relevant offers to buyers or for users to share information or rate products, etc. that may be relevant to them. These type of systems are commonly referred to as recommendation engines. Advantageously, such systems permit businesses and merchants to reach a given socio economic group for a given product or service or enable search firms to deliver content that is relevant to an individual by tailoring the search according to relevant information about the individual undertaking the search.

Moreover, there is ongoing discussion relating to systems incentivizing micro payments for delivery of online products or content. Conventionally, user payment for content has been very difficult to achieve and to date there is no successful method of implementing micropayments in lieu of content. As a result, the majority of online content is free and there are very limited economic models for online content providers. Accordingly, financial transaction network 500 provides a viable system of payment such that internet content providers can develop a revenue model for content.

Referring now to FIG. 6, a method 600 is illustrated for executing a fourth or fifth level financial transaction. It should be clear that while the method 600 is described for executing either a fourth or fifth level transaction, fourth and fifth level transactions can be executed independently or concurrently pending on how the customizable business rules are defined for the particular business or merchant. Moreover, the method is described as applying to the components illustrated in both FIGS. 4 and 5. However, it should be understood that because the functionality of these components is substantially the same, as discussed above, the method is applicable using either embodiment of financial transaction network 400 or 500.

As shown, initially at step 605, cardholder, merchants, businesses, government entities and/or other third party entities register with central system 410/510. As discussed above, registration may include inputting a plurality of credit card numbers, debit card numbers, tax codes and the like, as well as defining business rules for controlling processing of the fourth and/or fifth level financial transaction. The customizable business rules for fourth level payments are defined by the business/merchant via taxation interface 418c and the customizable business rules for fifth level payments are defined by the business/merchant via transaction interface 518c. Next, central system 410/510 links the plurality of card numbers and business rules to the respective businesses based on their existing tax identification number or another unique user ID that can be generated by the system (step 610).

At step 615, a primary transaction is executed at an existing point-of-sale, such as the business's/merchant's website. A primary transaction is generally a conventional transaction involving a credit card, debit card or the like. Alternatively, the primary transaction can be a merchant or business related expense. Once processing of the primary transaction is complete and central system 410/510 receives electronic digital information from issuing bank 422/522 or acquirer processor 424/524 (step 620), central system 410/510 is configured to determine whether any fourth and/or fifth level transaction(s) should be executed based on the customized business rules stored in database 414/514. As noted above, fourth level transactions are tax payments controlled by customized business rules defined by the merchants, businesses, government entities, and the like. Moreover, the fifth level transactions are commission/fee payments to third party entities and are controlled by customized business rules defined by the merchants, businesses, third party entities, and the like.

In particular, upon receipt of the information representing an additional payment message, central system 410/510 uses the tax identification number and/or unique user ID number associated with the merchant and/or business involved in the primary transaction to identify whether the merchant and/or business is registered (step 625). In the exemplary embodiment, central system 410/510 cross-references the tax identification number/unique user ID number with the information in database 414/514 to identify the associated business/merchant. Alternatively, if EFT network 430/530 has already identified the tax identification number, central system 410/510 utilizes the provided tax identification number to begin processing of the fourth and/or fifth level transaction(s). Central system 410/510 determines whether business rules relating to the fourth and/or fifth level transaction(s) have been defined by a government entity via government interface 418d and a third party via third party interface 518d.

In order to initiate execution of the fourth and/or fifth level transaction(s), transaction processor 416/516 applies the customized business rules and generates a new payment authorization request message to execute the one or more fourth/fifth level transactions (step 630). In the exemplary embodiment, the business rules may define the bank identification number, such as the routing number and bank number, for both the source account (e.g., merchant bank 426/526) and destination account (e.g., government bank 428/third party bank 528) as well as the value of the fourth/fifth level financial transaction(s).

Accordingly, central system 410/510 is configured to evaluate the electronic digital information representing the details of the primary transaction such as the value of the transaction, good(s) purchased, whether the good(s) were purchased via a website identified by a third party search engine, and the like, and determine whether the government entity and/or the third party entity as well as the particular business has defined business rules that establish whether a fourth and/or fifth level transaction should be executed based on the details of the primary transaction. In one refinement of this embodiment, details of the fourth/fifth level transaction are provided by the point-of-sales system at the merchant retailer.

If the customized business rules direct a fourth and/or fifth level transaction to be executed, central system 410/510 generates and forwards a fourth/fifth level payment request to EFT network 430/530 which in turn routes the message to merchant bank 426/526 and/or government bank 428/third party bank 528 (step 635). Upon receipt, if the fourth/fifth level transaction is approved by merchant bank 426/526 and/or government bank 428/third party bank 528, central system 410/510 updates the information stored in database 414/514. Furthermore, merchant bank 426/526 transmits the one or more fourth and/or fifth level payments to one or more predefined government banks 428 and/or third party banks 528 or vice-versa as defined in the business rules (step 640). Similar to the execution of the secondary payment discussed above, if the authorization payment request is declined, central system 410/510 is configured to generate an alert and transmit corresponding account information to the government and business system accounts in database 414/514 to advise of outstanding sums to be reconciled.

Based on the foregoing, it should be clear that the various alternative embodiments and advantages discussed above with respect to the embodiments illustrated in FIGS. 1-3 also apply to the embodiment described with respect to FIGS. 4-6. For example, in the exemplary embodiment, business participation needs to be instigated by the business via the taxation interface 418c and transaction interface 518c. However, in another embodiment businesses are automatically enrolled in a manner similar to the method described above with respect to FIG. 3. In yet another embodiment, businesses are automatically enrolled into central system 410/510 by government entities or the respective merchant banks.

While the foregoing has been described in conjunction with an exemplary embodiment, it is understood that the term "exemplary" is merely meant as an example. Accordingly, the application is intended to cover alternatives, modifications and equivalents, which may be included within the spirit and scope of the invention.

Additionally, in the preceding detailed description, numerous specific details have been set forth in order to provide a thorough understanding of the present invention. However, it should be apparent to one of ordinary skill in the art that the inventive test circuit may be practiced without these specific details. In other instances, well-known methods, procedures, components, and circuits have not been described in detail so as not to unnecessarily obscure aspects of the invention.

What is claimed is:

1. A method of transferring funds to the account of a customer via a tertiary transaction, comprising:
receiving, at a central system, information for a primary transaction, the central system comprising a transaction processor and a database storing registration data for a merchant loyalty reward program, and being in operable communication with a point-of-sale computer system;
executing the primary transaction between a cardholder and a merchant using the information for the primary transaction;
receiving electronic digital information (EDI) relating to the primary transaction from the point-of-sale computer system;
determining, by the transaction processor and based on the EDI that a merchant loyalty reward business rule applies to the primary transaction;
determining, by the transaction processor and based on the EDI and the registration data, that the customer is not registered with the merchant loyalty reward program;
generating a temporary unique user ID for the customer based on the customer not being registered with the central system;
transmitting, via an electronic funds transfer (EFT) network, a tertiary payment authorization request based on the determination that the merchant loyalty reward business rule applies to the primary transaction, thereby causing a tertiary payment to be posted to a temporary holding account based on the tertiary payment authorization request, wherein the tertiary transaction is unrelated to the primary transaction other than by being initiated by the primary transaction;

receiving confirmation of the customer's participation in the merchant loyalty reward program; and transmitting the confirmation from the central system to a merchant bank via the EFT network, the confirmation including details of a destination account, the transmitting of the confirmation thereby causing the tertiary payment to be transferred from the temporary holding account to the destination account.

2. The method of claim 1 wherein the EDI includes at least one of: (i) a value of the primary financial transaction, (ii) one or more products purchased in the primary financial transaction, (iii) a location of purchase, and (iv) an account identifier.

3. The method of claim 2 further comprising:

determining, by the transaction processor and based on the EDI, whether an advertisement business rule applies to the primary transaction; and transmitting, from the transaction processor to a bank server via an electronic funds transfer (EFT) network, authorization to conduct a quaternary transaction if the advertisement business rule applies to the primary transaction, wherein the quaternary transaction is unrelated to the primary transaction other than by being initiated by the primary transaction.

4. The method of claim 2 further comprising:

determining, by the transaction processor and based on the EDI, whether a tax rule applies to the primary transaction; and transmitting, from the transaction processor to a bank server via an electronic funds transfer (EFT) network, authorization to conduct a quaternary transaction if the tax rule applies to the primary transaction, wherein the quaternary transaction is unrelated to the primary transaction other than by being initiated by the primary transaction.

5. The method of claim 1 further comprising:

transmitting the EDI from the point-of-sale device to the transaction processor via an intermediary device; and storing the EDI in the database.

6. The method of claim 1 further comprising:

registering the cardholder with the transaction processor based on receipt of the confirmation of the customer's participation.

7. The method of claim 6 further comprising:

applying a set of merchant loyalty business rules to the registration of the cardholder in the transaction processor.

8. The method of claim 6 further comprising:

applying one or more of a merchant loyalty business rule, an advertisement business rule, and a tax rule to the registration of the cardholder.

\* \* \* \* \*